Figure 4:
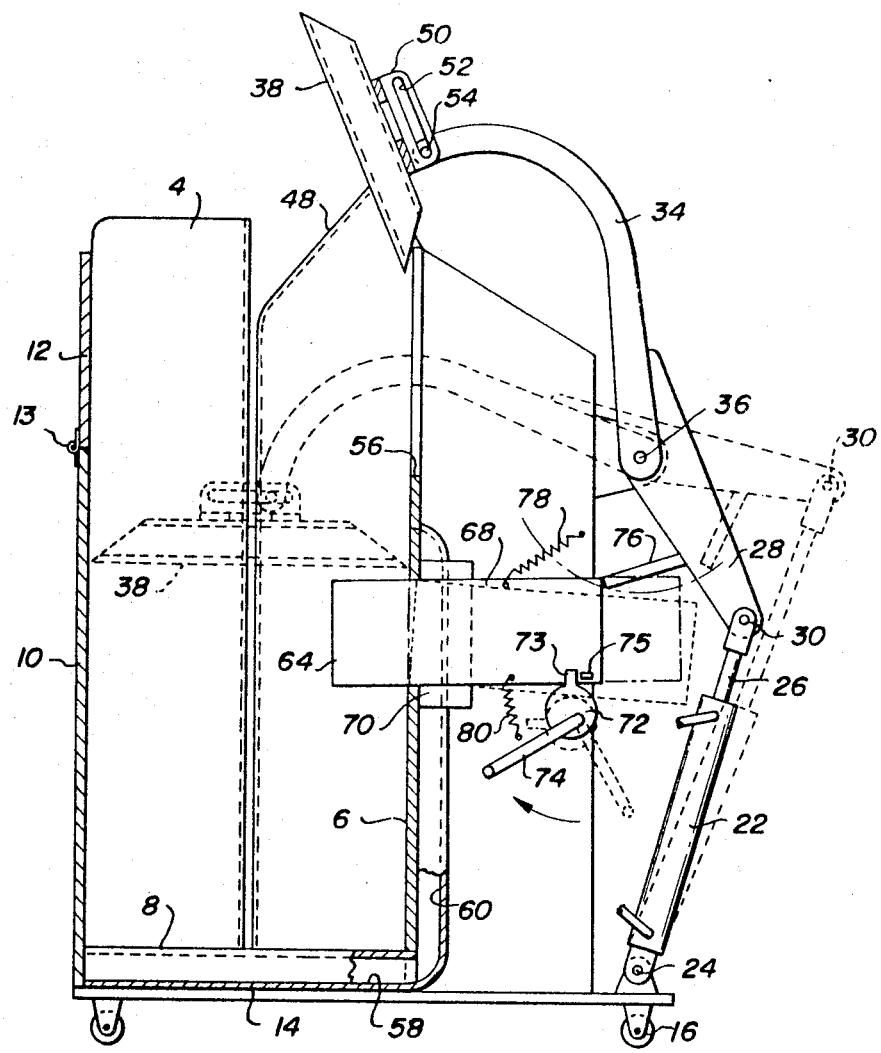

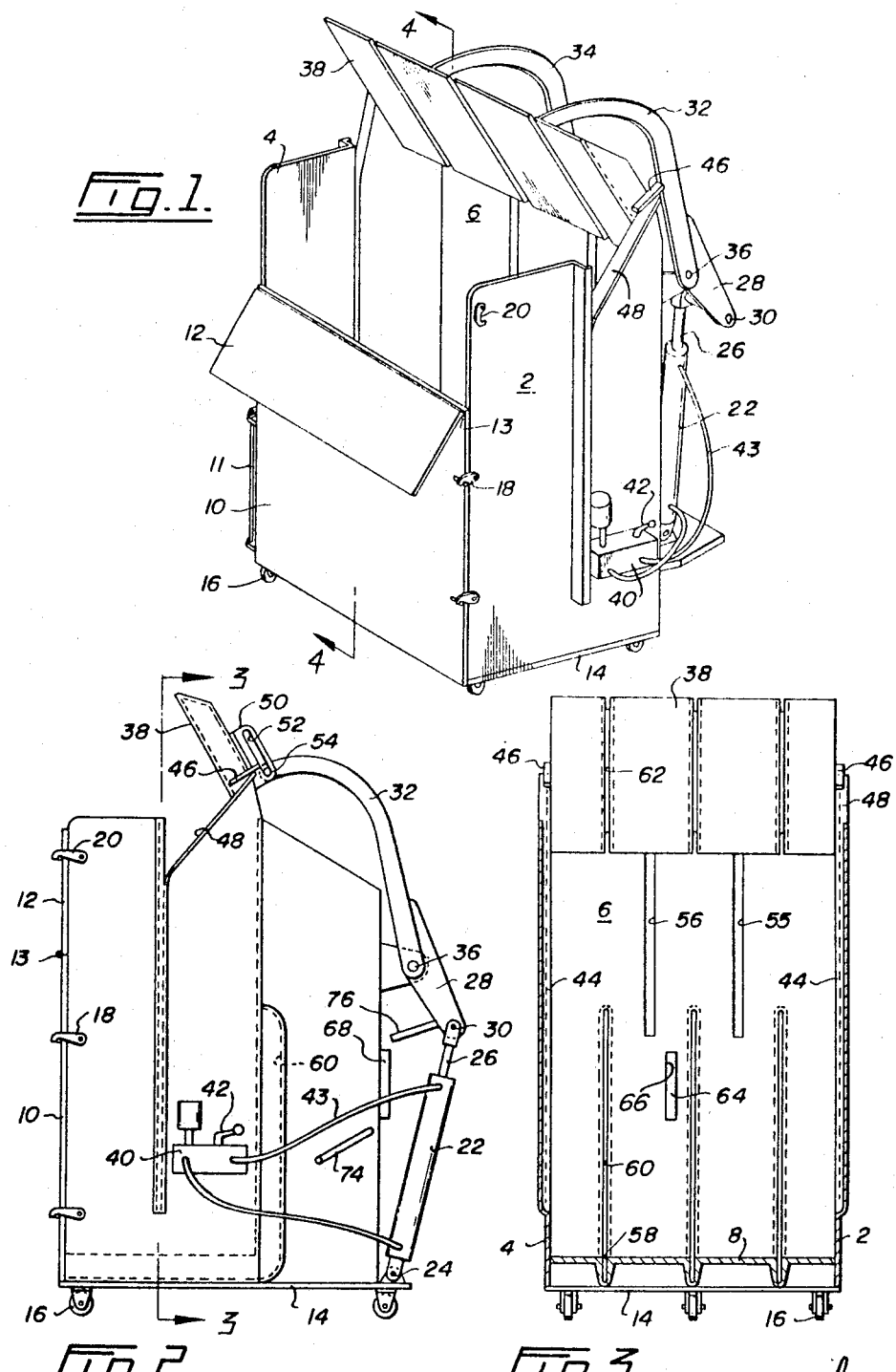

United States Patent Office 3,280,727
Patented Oct. 25, 1966

3,280,727
BALER
Edward Griffith Jonas, 7161 Berkeley St., Vancouver, British Columbia, Canada
Filed June 17, 1965, Ser. No. 464,612
Claims priority, application Canada, Apr. 7, 1965, 927,653
6 Claims. (Cl. 100—100)

The present invention relates to a baler, and particularly to a device for compressing and baling waste paper and corrugated boxes for disposal.

The baler of the invention is portable to the extent that it is mounted on free-rolling casters and can readily be moved from place to place, and needs only the availability of a standard 110–120-volt electric wall outlet for operation.

The baler also has a large charging area, the front of the baler is provided in the form of two hinged doors, and the pressing platen when in non-pressing positions is raised well above and out of the way during the filling operation, thus providing a baler which is quickly loaded and which has a large loading capacity.

The baler is also provided with a bale ejecting device whereby a completed bale is "kicked" free of the pressing box after completion.

The main object of the invention is to provide a paper or cardboard baling device which is portable and speedy in operation, and which has a large filling or charging capacity, which is quick and easy to operate to the complete safety of the operator, and which is provided with an ejector device which discharges the bale from the pressing box.

These and other objects and advantages of the present invention will become apparent from the following description taken in conjunction with the accompanying drawings wherein:

FIGURE 1 is a front perspective view of the baler, and showing the pressing platen in raised and non-pressing position, and the lower front door in closed position and the upper front door in open position, FIGURE 2 is a view of one side of the baler, FIGURE 3 is a cross-sectional front view along line 3—3 of FIGURE 2, and FIGURE 4 is a partial cross-section view along line 4—4 of FIGURE 1.

In FIGURES 1 and 2 the pressing box is composed of two sides 2 and 4 and a back panel 6, a floor or bottom panel 8 (see FIGURE 3) and two hinged doors 10 and 12. The pressing box being mounted upon a carrying base 14 which in turn is provided with free-wheeling casters 16.

The lower door 10 is hinged to side 4 (see one hinge at 11 in FIGURE 1) and when the door 10 is in closed position it is locked to side 2 by hooks 18. The upper door 12 is hinged at 13 (see FIGURE 2) to the lower door, and when in closed position is locked by means of hooks 20.

In FIGURE 2 a hydraulic cylinder 22 is pivotally attached to carrying base 14 at 24, and the piston 26 of the hydraulic cylinder 22 is pivotally attached to the lower pressing arm 28 at 30. The lower pressing arm 28 being fixedly secured to pressing arms 32 and 34, all be pivotally supported at 36. The pressing platen 38 is attached to the upper ends of the pressing arms 32 and 34 by pins and rollers in the manner shown in FIGURE 2 the purpose of which will be explained hereafter.

The hydraulic piston 26 is activated by means of control box 40 which consists primarily of an electric motor to drive a fluid pump and a control handle 42 to regulate the flow of fluid to cylinder 22. By turning handle 42 in one direction hydraulic fluid will pass into cylinder 22 via line 43 to draw piston 26 into cylinder 22, and raise pressing platen 38 to the position shown in FIGURE 2. By turning handle 42 the other way piston 26 will be forced out of cylinder 22 and will cause the pressing arms to pivot at 36 and lower pressing platen 38 into the pressing box in paper compressing position. The electric motor in the control box is connected to a standard electrical outlet by means not shown.

The inside wall of each side of the box is provided with vertical grooves 44 to accommodate a flange 46 provided upon each end of the pressing platen 38. In FIGURE 2 the flanges 46 of the platen are shown resting on flanged surfaces 48 which are upward extensions of grooves 44. As the pressing platen 38 is lowered by the pivoting of the pressing arms at 36, flanges 46 will follow flanged surfaces 48 into grooves 44. This is possible due to the attaching arrangement of platen 38 to pressing arms 32 and 34. The top of the platen 38 is provided with two pairs of projections 50 which have elongated slots 52 therein. The ends of the pressing arms are provided with pins and rollers 54 which bear in the slots 52, to enable the ends of the pressing arms to move relative to the pressing platen as the pressing platen is guided downwardly first by flanged surfaces 48 and then by vertical grooves 44. This method of guiding the pressing platen ensures that the platen will stay level and true during a pressing operation and that the platen will not tend to "stilson."

In FIGURE 3 the back panel 6 is shown as having two vertical slots 55 and 56 provided in the upper portion thereof. These slots 55 and 56 are provided to accommodate pressing arms 32 and 34 as these arms press the platen 38 down into the pressing box.

Also clearly shown in FIGURE 3 are recessed grooves 58, 60 and 62 provided in the bottom, back and pressing platen respectively. These grooves are provided to assist in the insertion of wires around the pressed bale while the bale is still under compression by the platen, and will be discussed in more detail hereafter.

The front end 64, of a bale ejecting plunger 68 is shown positioned in a slot 66 provided in panel 6, in FIGURE 3. The bale ejecting mechanism is more clearly shown in FIGURE 4. The bale ejecting plunger 68 is supported at its forward end 64 by a rearward extension 70 of the periphery of slot 66, and at its rearward end by a horizontally disposed eccentrically mounted axle 72 the rotation of which is controlled by handle 74. Three positions of the ejector plunger are illustrated in FIGURE 4. The plunger shown in full lines is in the full bale ejecting position, in dotted lines when in the load filling and bale compressing stages, and in dot and dash lines when in preparatory bale ejecting position.

When the pressing box is being loaded and during the subsequent bale pressing and bale tying operations the bale ejector plunger will be in the position shown by dotted lines and the handle 74 is also in its dotted line position. Before the platen is returned from its its pressing position shown in dotted lines in FIGURE 4 to its "at rest" position shown in full lines, the operator turns the handle 74 clockwise (see arrow) to the position shown in full lines, to rotate the eccentrically mounted axle and raise the rear end of the plunger to the position shown in dot and dash lines. The hydraulic cylinder is then activated and the platen and pressing arm return to their "at rest" position while at the same time a dog or projection 76 provided on the lower pressing arm 28 contacts the rear surface of the ejector plunger 68 and drives the plunger through slot 66 provided in panel 6 to the position shown in full lines in FIGURE 4 to discharge the bale from the pressing box.

The eccentrically mounted axle 72 is provided with a lug 73 as shown in FIGURE 4. As handle 74 and axle 72 are rotated to the position shown in full lines in FIGURE 4, lug 73 points generally upwardly and is contacted by a lug 75 provided on ejector plunger 68 and as the plunger is pushed into the pressing box by dog 76 lug 75 rotates eccentric axle 72 back to the position shown in dotted lines. This rotation of axle 72 allows the rear end of the plunger 68 to drop from contact with dog 76, and springs 78 and 80 automatically return the plunger 68 to its dotted line position.

The operation of the baler of this invention is a simple one man operation as follows. When the baler has been moved to the desired location for baling the pressing platen is raised to the position shown in FIGURE 1 and the lower portion 10 of the door is locked shut. The upper portion 12 of the front door may be left in the open position as shown in FIGURE 1 to facilitate loading.

The operator then fills the baler with waste material to be baled, and then closes and locks upper door 12. By turning handle 42 on the control box, the operator lowers the pressing platen into the pressing box, and the pressing will continue either until handle 42 is returned to neutral position, or until a predetermined pressure is reached at which time a regulating device in the control box automatically prevents further pressing.

With the bale in compressed form and the pressing platen in bale compressing position as shown in dotted lines in FIGURE 4, the operator opens doors 10 and 12 and inserts tying wires around the bale by means of grooves 58, 60 and 62 provided in the bottom, back and pressing platen. The wires are then tightly tied to maintain the bale in compressed form.

The operator then turns handle 42 to cause the pressing platen to lift from bale compressing position and at the same time rotates handle 72 from the position shown in dotted lines to the position shown in full lines to raise bale ejector plunger 68 to cause it to be contacted by dog 76 provided upon the lower pressing arm 28. As the pressing arms rotate at 36, dog 76 forces bale ejecting plunger 68 into the pressing box through slot 66, and the compressed bale is displaced from the pressing box.

Due to the automatic rotation of handle 72 back to the position shown in dotted lines in FIGURE 4, springs 78 and 80 will return the plunger to its dotted line position in FIGURE 4, after the bale ejecting cycle.

The operator then closes door 10, and the machine is ready for refilling.

The embodiments of the invention in which an exclusive property or privilege is claimed are defined as follows:

1. A baler comprising a pressing box consisting of side, back and bottom sections and a hinged door adapted to be locked in box forming position, a hydraulic cylinder and piston mounted exteriorly of said pressing box and adjacent the back section, at least one lower pressing arm having one end pivotally attached to said piston, at least one upper pressing arm pivoted exteriorly of said pressing box, one end of said upper pressing arm being attached to the other end of said lower pressing arm, a pressing platen, and the other end of said upper being attached to said pressing platen, a flange provided on each end of the pressing platen and adapted to engage vertical grooves provided in the interior surface of the sides of the pressing box, and means for actuating said hydraulic piston to pivot said upper pressing arm and cause said pressing platen to be lowered into and removed from the pressing box, and at least one vertical slot provided in the upper end of the back section of the pressing box to accommodate said upper pressing arm as the platen is lowered into the pressing box.

2. A baler according to claim 1 being mounted on free-wheeling casters for portability.

3. A baler according to claim 1 and being provided with continuous grooves in the bottom and back sections of the pressing box, and the lower surface of the pressing platen for the insertion of tying wires.

4. A baler according to claim 1 having a bale ejecting plunger mounted adjacent and exteriorly of the back section of the pressing box, a projection on said lower pressing arm, said plunger being adapted to be partially displaced into said pressing box through a slot provided in the back section under the action of said projection provided on said lower pressing arm and handle means to bring said plunger into the path of movement of said projection.

5. A baler according to claim 1, the upper surface of said pressing platen being provided with at least one projection with an elongated slot provided therein to receive a pin and roller provided on the end of the upper pressing arm.

6. A baler according to claim 1 the upper end of the side sections being provided with flanged sections to guide the flanges on the pressing platen into the vertical grooves provided in the side sections of said pressing box.

References Cited by the Examiner

UNITED STATES PATENTS

| | | | |
|---|---|---|---|
| 982,650 | 1/1911 | Walters | 100—34 X |
| 1,121,449 | 12/1914 | Babcock | 100—255 X |
| 1,125,362 | 1/1915 | Macomber | 100—255 |
| 1,975,013 | 9/1934 | Minnich. | |
| 3,024,720 | 3/1962 | Welsh | 100—245 X |
| 3,195,447 | 7/1965 | Taylor | 100—100 X |

WALTER A. SCHEEL, *Primary Examiner.*

BILLY J. WILHITE, *Examiner.*